US009219934B2

(12) United States Patent
Bull et al.

(10) Patent No.: US 9,219,934 B2
(45) Date of Patent: Dec. 22, 2015

(54) DATA STREAM RATE ADAPTATION MECHANISM

(75) Inventors: David Bull, Bristol (GB); James Chung How, Bristol (GB); Andrew Nix, Bristol (GB); Jon Pledge, Bristol (GB)

(73) Assignee: Global Invacom Limited, Althorne, Essex (GB)

( * ) Notice: Subject to any disclaimer, the term of this patent is extended or adjusted under 35 U.S.C. 154(b) by 0 days.

(21) Appl. No.: 13/704,102

(22) PCT Filed: Jun. 22, 2011

(86) PCT No.: PCT/GB2011/051169
§ 371 (c)(1),
(2), (4) Date: Jun. 18, 2013

(87) PCT Pub. No.: WO2011/161450
PCT Pub. Date: Dec. 29, 2011

(65) Prior Publication Data
US 2013/0263202 A1 Oct. 3, 2013

(30) Foreign Application Priority Data

Jun. 22, 2010 (GB) .................................. 1010477.6

(51) Int. Cl.
*H04N 7/18* (2006.01)
*H04N 7/173* (2011.01)
(Continued)

(52) U.S. Cl.
CPC ........... *H04N 21/266* (2013.01); *H04N 19/115* (2014.11); *H04N 19/137* (2014.11);
(Continued)

(58) Field of Classification Search
CPC .................. H04Q 2213/13332; H04Q 3/0066;
H04J 3/1682; H04J 2203/0083; H04M 3/22;
H04N 19/115; H04N 19/137; H04N 19/14;
H04N 19/147; H04N 19/157; H04N 19/162;
H04N 19/164; H04N 19/177; H04N 21/23406;
H04N 21/23608; H04N 21/2365; H04N
21/23655; H04N 21/2381; H04N 21/2385;
H04N 21/2402

USPC .................................. 725/114, 116, 118, 120
See application file for complete search history.

(56) References Cited

U.S. PATENT DOCUMENTS 6,170,022 B1 *  1/2001  Linville et al. .................. 710/29
2003/0081692 A1 *  5/2003  Kwan et al. ..................... 375/295
(Continued)

FOREIGN PATENT DOCUMENTS

WO    WO 2007140429 A2    12/2007

OTHER PUBLICATIONS

Pierre Ferre, et al, Distortion-based Link Adaptation for Wireless Video Tranmission, EURASIP Journal on Advances in Signal Processing, vol. 2008, 253706 Mar. 10, 2008, p. 1-17.

*Primary Examiner* — Benjamin R Bruckart
*Assistant Examiner* — Jen-Shi Huang
(74) *Attorney, Agent, or Firm* — Gable Gotwals

(57) ABSTRACT

A method of controlling data transfer in a data transmission system which includes a plurality of video and/or audio data sources, a single transmitter operable to transmit data from the data sources over at least one transmission channel, a plurality of client receivers operable to receive transmitted data, the method comprising estimating available channel capacity for each client receiver, using parameters relating to the at least one transmission channel, and using information from the transmitter and receiver, and using information relating to queuing of data between the data sources and the transmitter; determining a target bit transmit rate for each client receiver in dependence upon the estimated channel capacity, a quality parameter, and an activity parameter for the client receiver concerned; and controlling the data sources and transmitter in dependence upon the determined bit transmit rate.

16 Claims, 4 Drawing Sheets

(51) Int. Cl.
*H04N 21/266* (2011.01)
*H04N 21/234* (2011.01)
*H04N 21/236* (2011.01)
*H04N 21/2365* (2011.01)
*H04N 21/2381* (2011.01)
*H04N 21/2385* (2011.01)
*H04N 21/24* (2011.01)
*H04N 21/258* (2011.01)
*H04N 21/434* (2011.01)
*H04N 21/4363* (2011.01)
*H04N 21/438* (2011.01)
*H04N 21/61* (2011.01)
*H04N 21/6377* (2011.01)
*H04N 21/658* (2011.01)
*H04N 19/147* (2014.01)
*H04N 19/115* (2014.01)
*H04N 19/14* (2014.01)
*H04N 19/137* (2014.01)
*H04N 19/157* (2014.01)
*H04N 19/162* (2014.01)
*H04N 19/164* (2014.01)
*H04N 19/177* (2014.01)

(52) U.S. Cl.
CPC ............ *H04N 19/14* (2014.11); *H04N 19/147* (2014.11); *H04N 19/157* (2014.11); *H04N 19/162* (2014.11); *H04N 19/164* (2014.11); *H04N 19/177* (2014.11); *H04N 21/2365* (2013.01); *H04N 21/2381* (2013.01); *H04N 21/2385* (2013.01); *H04N 21/23406* (2013.01); *H04N 21/23608* (2013.01); *H04N 21/23655* (2013.01); *H04N 21/2402* (2013.01); *H04N 21/25833* (2013.01); *H04N 21/4344* (2013.01); *H04N 21/4347* (2013.01); *H04N 21/4363* (2013.01); *H04N 21/4381* (2013.01); *H04N 21/6131* (2013.01); *H04N 21/6377* (2013.01); *H04N 21/658* (2013.01)

(56) References Cited

U.S. PATENT DOCUMENTS

2006/0224762 A1    10/2006   Tian et al.
2007/0153916 A1 *   7/2007   Demircin et al. ........ 375/240.26
2009/0158358 A1 *   6/2009   Yu et al. .......................... 725/62

\* cited by examiner

DATA STREAM RATE ADAPTATION MECHANISM

CROSS-REFERENCE TO RELATED APPLICATIONS

This application is the United States National Phase of PCT Patent Application No. GB2011/051169 filed on 22 Jun. 2011, which claims priority to British Patent Application No. 1010477.6 filed 22 Jun. 2010, both of which are incorporated herein by reference.

The present invention generally relates to a data stream rate adaptation mechanism. In particular, although not necessarily exclusively, the present invention relates to a rate adaptation mechanism to optimise the transmission of multiple high definition video and/or audio streams over a communication channel or number of channels and with particular use in relation to a single wireless communication channel.

It is known to provide for the wireless streaming of video in a building such as a domestic premises. Typically there will be provided a plurality of different apparatus within the premises including, for example, a broadcast data receiver (also referred to as a step top box), and a DVD player which are connected to the display screen and speakers which are typically the most commonly used in the premises and located for example in the lounge. An HDTV transmitter can also be provided to stream video and audio to a range of wireless video receivers located in other parts of the premises and thereby allow video and audio feeds to be available for connection to apparatus at those locations.

Methods for designing and utilising a system with a wireless transmitter which is used to send a single video stream to a single wireless receiver are relatively well understood. In the simplest implementation, the total of video bitrate plus audio bitrate must not exceed the capacity of the wireless channel. The rest of this document refers simply to video bitrate for brevity, because the audio bitrate is small compared to video bitrate, and reference hereonin to video bitrate should be interpreted as including audio bitrate when present. It should also be clear that, if required, the invention could be utilised for the transmission of audio only. In practice, the capacity of the wireless channel varies with time, for example, due to people moving in the house, or due to radio interference. Therefore, in the better single-channel systems, the video rate is automatically adjusted or 'adapted' so that at any instant the video rate does not exceed the current capacity of the wireless channel.

In a yet more sophisticated single-channel rate adaptation scheme, both the video rate and wireless Modulation and Coding Scheme (MCS) mode are changed to minimise the distortion of the received video. See for example "Distortion Based Link Adaptation for Wireless Video Transmission", Eurasip Journal on Advances in Signal Processing (Special Issue), Volume 2008, pp 1-17, doi:10.1155/2008/253706, in which video distortion is minimized by adapting dynamically to the prevailing channel conditions over which the video streams are being wirelessly transmitted. The dynamic adaptation operates using a rate distortion model which takes account of information relating to the content type being transmitted, an assessment of the error impact on the transmitted data and the resilience features implemented within the Video-Adaptive MCS. The rate distortion model then uses this information to determine the overall video quality benefits of switching from the current MCS mode to an adjacent MCS mode. However, once again, this scheme is designed for a system in which a single video stream is transmitted over a wireless channel.

The principle objective of the present invention is to provide a method by which the benefits of rate adaptation for use in transmission systems can be applied to systems in which multiple video streams are required to be transmitted over a defined number of communication channels and most typically a single, varying wireless channel.

According to a first aspect of the invention there is provided a method of controlling data transfer in a video system which comprises one or more video data sources, a transmitter operable to transmit video data from the one or more video data sources using at least one transmission channel, a plurality of client receivers operable to receive transmitted video data over said at least one transmission channel, wherein the method includes the steps of; estimating available channel capacity for the client receivers using parameters relating to the transmission channel concerned, and/or information available at the transmitter and/or receiver, and/or information relating to queuing of video data between the video data sources and the transmitter; determining a target bit transmit rate for the client receivers in dependence upon the estimated channel capacity, a quality parameter, and/or an activity parameter for the client receiver concerned; and controlling the video data sources and transmitter in dependence upon the determined bit transmit rates.

Typically the channel capacity estimate and target bit transmit rate is calculated for each of the client receivers.

Typically the estimate of the available channel capacity is made using parameters relating to the transmission channel concerned, and information available at the transmitter and receiver, and information relating to queuing of video data between the video data sources and the transmitter.

In one embodiment there is provided one transmission channel.

In one embodiment the at least one transmission channel is a wireless communication means via which the video can be transmitted.

In an alternative embodiment the at least one transmission channel is a cable via which the video can be transmitted Typically the target bit transmit rate is determined for each of the client receivers in dependence upon the estimated channel capacity, a quality parameter, and an activity parameter for the client receiver concerned.

The determining of the target bit transmit rate for each client receiver using this method enables the optimization of transmission of data to each client receiver over a single transmission channel.

Preferably the quality parameter for a client receiver relates to respective picture quality for each of the client receivers. The quality expectation for each client receiver will be client receiver dependent and impact upon the target bit transmit rate for that client receiver.

Information available at the transmitter and receiver such as modulation and coding scheme (MCS), packet error rate (PER), number of automatic repeat requests (ARQs) and received signal strength (RSSI) may also be used in determining the target bit transmit rate for a client receiver, the information being related to the client receiver concerned.

In one embodiment of the invention, a rate-distortion model is used in determining the target bit transmit rates, and typically the rate-distortion model relates to all of the client receivers.

The transmitters may be radio transmitters and the receivers may be radio receivers, in which case the transmission channels are provided via an air interface (wireless) between the transmitters and receivers.

According to a second aspect of the invention there is provided a method of transmitting video data in a multi stream video system comprising the steps of using the method according to the first aspect of the invention, and then transmitting video data over the at least one transmission channel from the transmitter to the plurality of receivers.

In one embodiment, the implementation of the method of controlling data transfer in the method of transmitting video data enables the optimization of transmission of video data to each of a plurality of client receivers over a single transmission channel.

According to a third aspect of the invention there is provided a method of controlling data transfer in a data transmission system which comprises a plurality of video and/or audio data sources, a transmitter operable to transmit the said data from the data sources using at least one transmission channel, a plurality of client receivers operable to receive the data transmitted over the at least one transmission channels, the method comprising:
  estimating available channel capacity for each client receiver, using at least one parameter relating to the at least one transmission channel,
  determining a target bit transmit rate for each client receiver in dependence upon the estimated channel capacity, and/or a quality parameter, and/or an activity parameter for the client receiver concerned; and
  controlling the video data sources and transmitter in dependence upon the determined bit transmit rates.

In one embodiment the data is transmitted over a single, wireless, transmission channel.

In one embodiment the estimate of the available channel capacity is made with reference to parameters of the information obtained from packet dispersion measurements and/or relating to queuing of video data between the video data sources and the transmitter.

Preferably the quality parameter for a client receiver relates to respective picture quality for each of the client receivers.

In a further aspect of the invention there is provided a data transmission system comprising:
  a plurality of video sources operable to output respective video data streams;
  a transmitter operable to receive video data streams from the video sources, and operable to transmit such video data streams using transmission channels;
  a plurality of client receivers operable to receive video data streams over respective transmission channels from the transmitter;
  a transmit controller operable to estimate available channel capacity for each client receiver, using parameters relating to the transmission channel concerned, and using information relating to queuing of video data between the video data sources and the transmitter, to determine a target bit transmit rate for each client receiver in dependence upon estimated channel capacity, a quality parameter, and an activity parameter for the client receiver concerned, and to control the video data sources and transmitter in dependence upon determined bit transmit rates.

The transmit controller may be operable to use information available at the transmitter and receiver such as modulation and coding scheme (MCS), packet error rate (PER), number of automatic repeat requests (ARQs) and received signal strength (RSSI) in determining the target bit transmit rate for a client receiver. Typically the information is related to the client receiver concerned. The transmit controller may further be operable to use a rate-distortion model in determining the target bit transmit rates. Typically the rate distortion model relates to all of the client receivers.

The use of these features by the transmit controller facilitates optimization of the target bit transmit rates to best suit each client receiver requirement.

In one embodiment the transmitter may be a radio transmitter; in addition, the receivers may be radio receivers, and in one embodiment the transmission channel is provided via an air interface between the transmitter and receivers.

In a further aspect of the invention there is provided apparatus for providing and controlling data transfer in a system for transmitting data, said apparatus comprising a plurality of video data sources, at least one transmitter operable to transmit video data from the video data sources using at least one transmission channel, a plurality of client receivers operable to receive transmitted video data over the at least one transmission channel, wherein the apparatus further includes a transmit controller in communication with the video data sources and transmitter and within the transmit controller there is provided a data stream rate adaptation mechanism to allow the determination of the data bit transmit rates and to control the video data sources and transmitter in dependence upon the said determined bit transmit rates.

In one embodiment the transmit controller is also in communication with the receivers.

The inclusion of a transmit controller in the multi stream video system enables dynamic optimization of the bit transmit rates employed by the video sources for the transmission of the data streams across the available channel.

These and other aspects of the present invention will be more clearly understood from the following description and, by way of example only, with reference to the following figures, in which.

Figure 1:
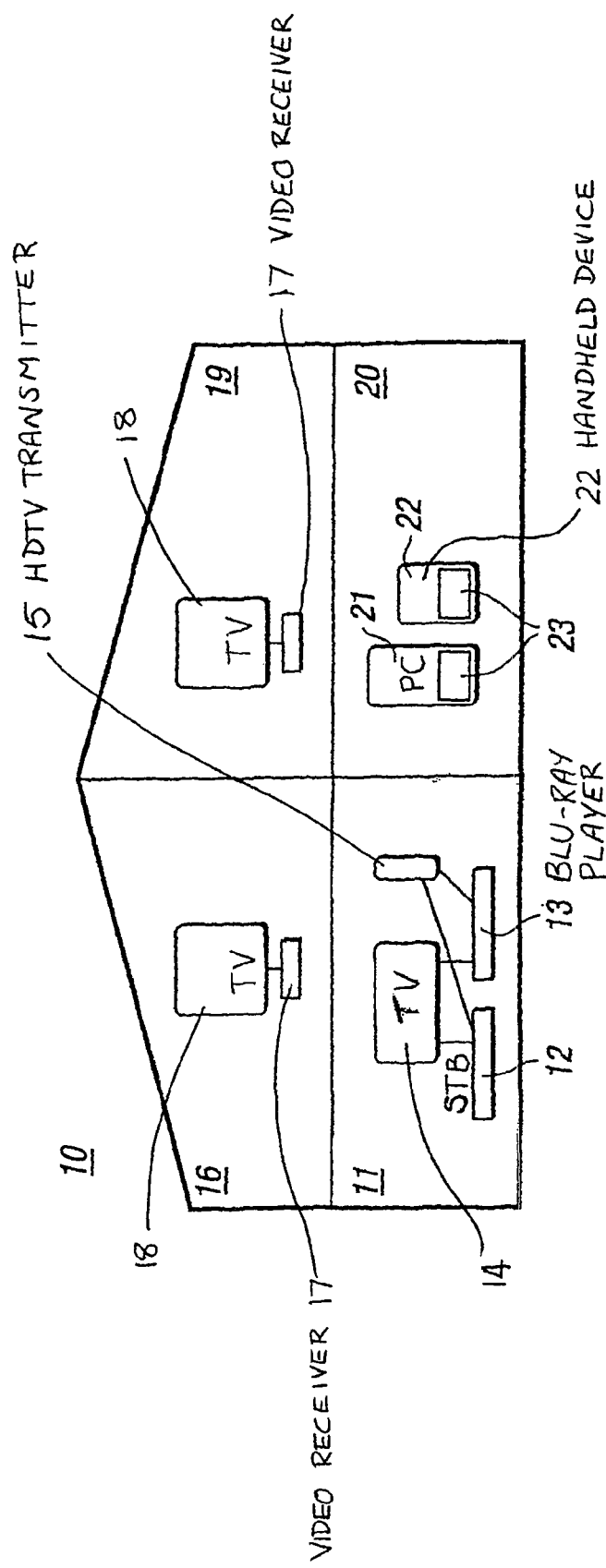
FIG. 1 is a schematic diagram of an example of an environment in which a wireless transmission system is implemented.

Referring firstly to FIG. 1 there is shown an example of a video and audio transmission system which, in this case is wireless, and is implemented in a building in the form of a domestic premises 10 with the specific application of this embodiment of the invention being the wireless streaming of video to different locations in the home premises. In this example, in room 11, a set-top box 12 and Blu-ray player 13 are connected to the main television 14. The set-top box 12 and Blu-ray player 13 also feed a wireless HDTV transmitter 15, which streams video and audio to wireless receivers in rooms 16, 19 and 20. In rooms 16 and 19, the wireless video receivers 17 are separate units connected to respective high definition televisions 18. In room 20, the video is received by a wireless-equipped PC 21, incorporating software for wireless video reception and display 23. Also in room 20, the video can be received by the handheld device 22, which is a WiFi equipped smart-phone, PDA or similar, again incorporating wireless receive software 23.

Figure 2:
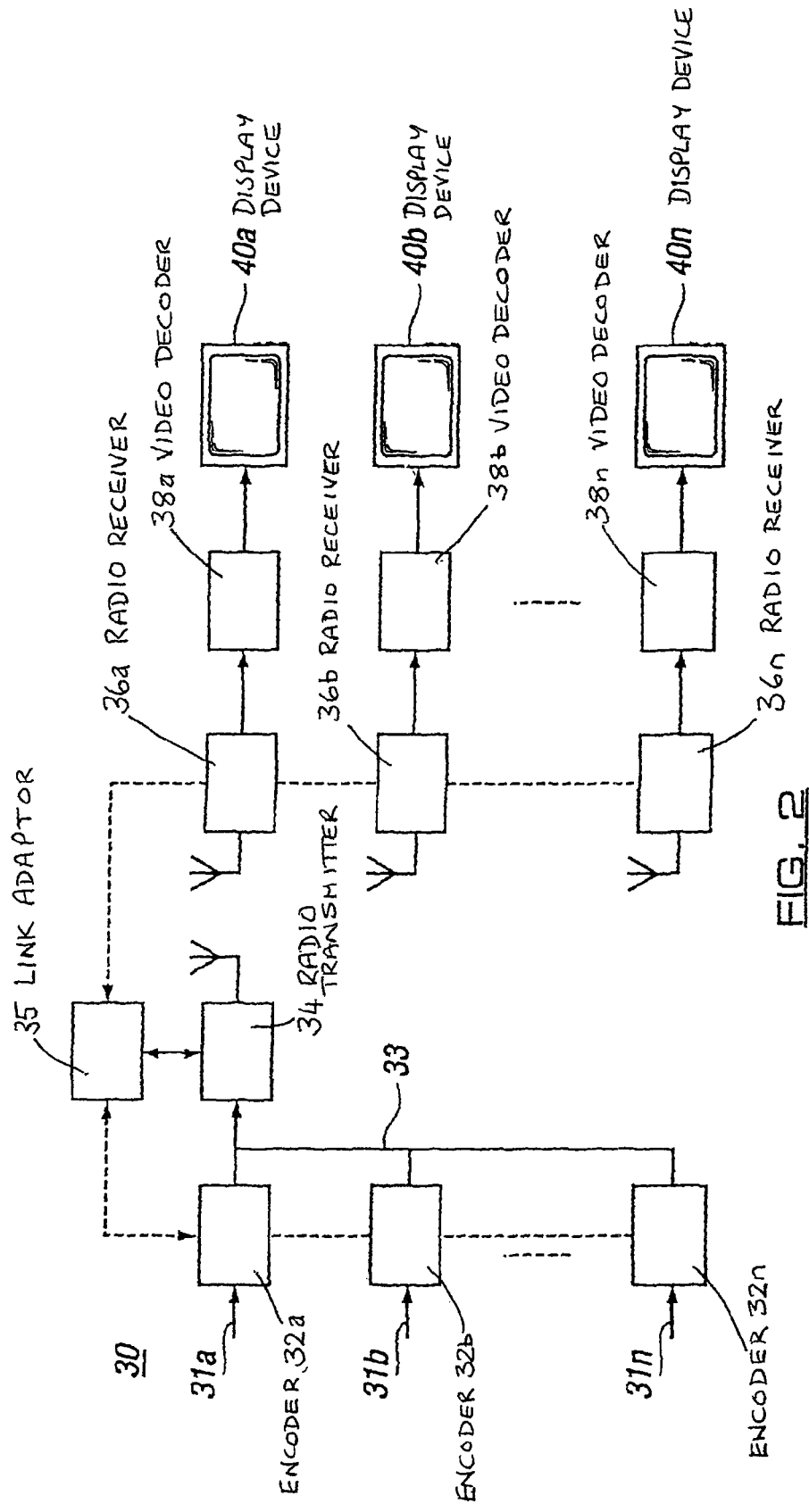
FIG. 2 is a schematic diagram of a wireless transmission system according to an embodiment of the present invention.

In accordance with one embodiment of the invention and with reference to FIG. 2, there is shown a wireless transmission system 30 having multiple video encoders 32a-32n sharing a single radio transmitter 34 via connection 33. It should also be appreciated that in other embodiments the video and/or audio content may be encoded previously, in which case the encoders 32a-32n may be replaced by devices capable of changing the bit-rate, format or resolution of an encoded video and/or audio stream, e.g. transcoders. In a further embodiment, where the encoders are located remote from the premises, the encoders or transcoders may not be needed, so long as there is a means of signalling to each remote encoder or transcoder the bit-rate required. In the following description, the embodiment using encoders 32a-32n is assumed, however the invention applies equally to the alternative embodiments. The transmission system 30 further comprises multiple wireless receivers, in this case radio receivers 36a-36n each linked to a corresponding video decoder 38a-38n which is in turn connected to a corresponding display device 40a-40n.

The display device is typically a high definition TV. Each video encoder 32a-32n is provided with a corresponding input video signal 31a-31n. As can be seen, in this system 30, multiple video streams which are being output from video encoders 32a-32n, will be transmitted over a single, wireless, transmission channel from transmitter 34. The wireless transmission system 30 is further provided with a transmit controller, in this case, link adaptor 35 which is in communication with video encoders 32a-32n; transmitter 34 and, optionally, receivers 36a-36n. Within the link adaptor 35 there is provided a video stream rate adaptation mechanism 50 which is described in more detail with reference to FIG. 3. During use, each video encoder 32a-32n compresses the received individual input video signal 31a-31n at a target bit rate of $k_i$ bits per second. The target bit rate for the corresponding encoders 32a-32n will be determined by the link adaptor 35 to optimize the bit allocation rate for each of the video streams in the wireless transmission channel.

Figure 3:
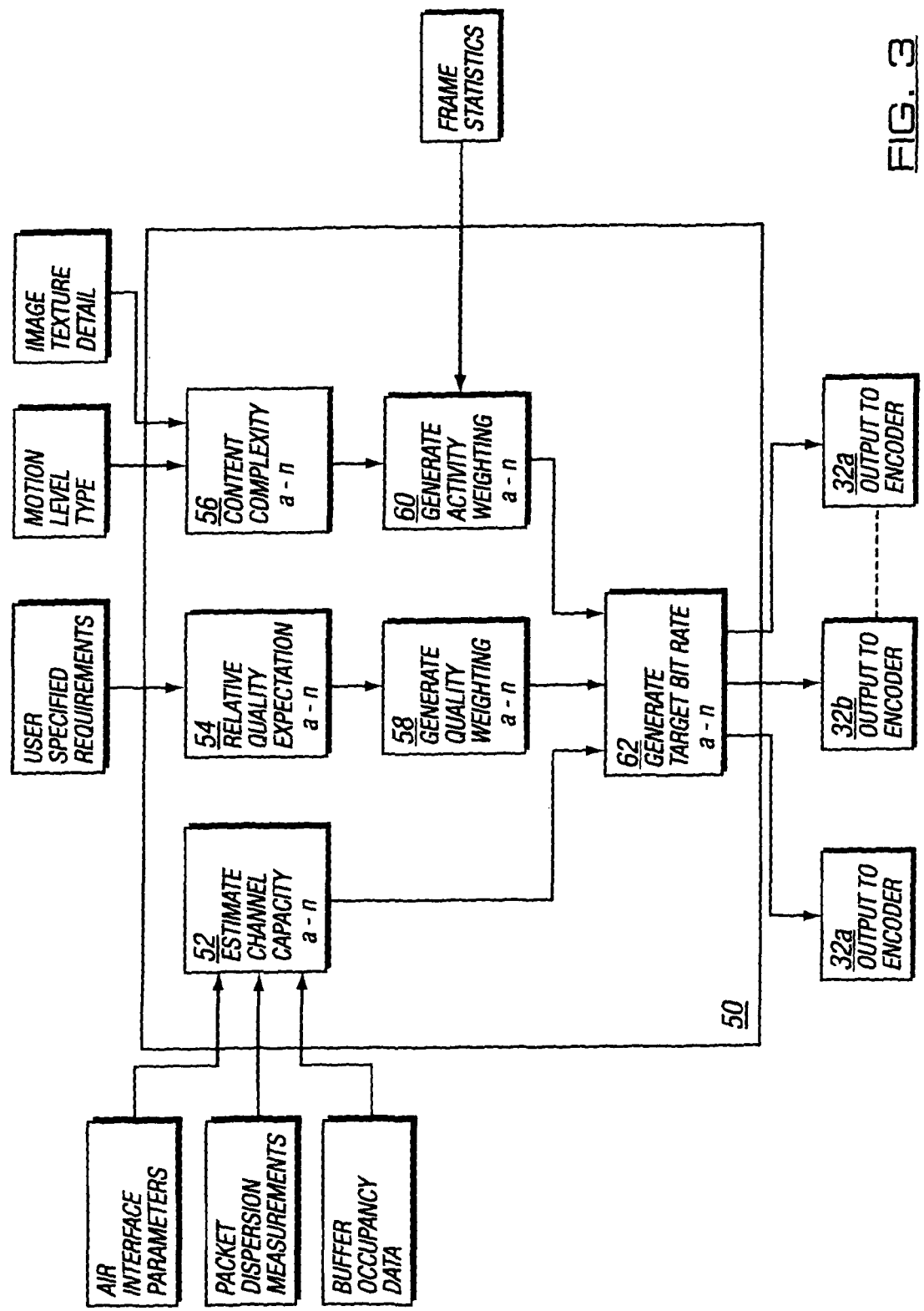
FIG. 3 is a first embodiment of a rate adaptation mechanism for use in the wireless transmission system of FIG. 2.

With reference to FIG. 3, there can be seen a schematic illustration of the rate adaptation mechanism 50, which operates within the link adaptor 35, which shows the steps used to implement the optimization of the bit rate allocation and data transfer.

The rate adaption mechanism 50 firstly generates 52 an estimate of the channel capacity for each radio receiver 36a-36n. In this case, the rate adaption mechanism receives parameters obtained from the transmitter 34 and, optionally, receivers 36a-36n including, but not limited to modulation and coding scheme (MCS), packet error rate (PER), number of automatic repeat requests (ARQs), and received signal strength indication (RSSI) and uses these parameters to obtain estimates of channel capacity for each receiving client. In this case, the rate adaptation mechanism 50 may optionally use measurements obtained from the receivers 36a-36n using packet dispersion whereby the transmitter 34 transmits a number of data packets, back to back into the channel and estimates channel capacity based on the relative delay between the reception of the packets at the chosen receiver. In this case, the rate adaptation mechanism 50 may further utilise data provided by monitoring buffer occupancies at the outputs of encoders 32a-32n and the input to radio transmitter 34. There may be buffers in the radio chip or its associated software driver. In one embodiment if the occupancy of these buffers cannot be read directly, then it may be possible to infer total occupancy using the data packet transfer time from encoder to client.

It will be understood that the rate adaption mechanism may alternatively employ any one or any combination of the received parameters, the packet dispersion measurement or the buffer occupancy data to generate the channel capacity estimates. The estimated channel capacity $C_i$ for each radio receiver 36a-36n represents the available channel throughput for each radio receiver 36a-36n if it were to utilise 100% of the channel.

The rate adaptation mechanism 50 then establishes 54 the relative video quality expectations at the output of each decoder 38a-38n. The quality differentials are, in this case, specified by the user of each display device 40a-40n and take into account factors such as the expectations of resolution and clarity required by a large LCD main TV as opposed to those expected for a small bedroom TV or a PC monitor In one embodiment, the quality differentials can be determined, or modified, automatically by a set of rules which could, for example, be embodied in the software of the system. In one example, the resolution of the video fed to each encoder, and the resolution of each display device could be used to calculate automatically the quality differential. In another example, it might be desirable to allocate equal channel time utilization to all the clients sharing the same wireless channel. This could be beneficial in the case where there is a distant client requiring a very robust modulation mode, which is disproportionately costly in transmission time. In this case, the distant client would receive a lower bit rate than the nearer clients, at the expense of quality, in order to preserve quality seen at those clients nearer to the encoder.

A quality weighting, $Q_i$, is generated 58, by the rate adaptation mechanism 50, for each video decoder 38a-38n using the quality expectation data. In a simple case, the quality may be assumed to be equal for each receiver and directly proportional to bit rate, with:

$$Q_i = \frac{1}{N}$$

In all cases:

$$\sum_i Q_i = 1.$$

The rate adaptation mechanism 50 then establishes 56 the complexity of the content being encoded by each encoder 32a-32n whereby factors such as the motion level and type and level of texture detail of the content, and quantization parameter (QP) values used by the encoder are relevant to the target bit rate for any given quality.

The rate adaptation mechanism 50 also dynamically generates 60 an activity weighting, $A_i$, which reflects the relative demands of the content of each input video stream 31a-31n from its respective encoder 32a-32n. In one example, the activity weighting is generated at the same time as the content complexity rating, meaning that steps 56 and 60 are effectively combined. In another example, the steps are separated.

In either case, the activity weighting is generated based on parameters related to content complexity such as motion complexity, texture detail, QP values, etc. Frame statistics, including motion vector and texture variance, are used to provide the input data for the activity weighting. In the simplest option, which is described here for illustrative purposes only, the activity of all video streams is identical, such that:

$$A_i = \frac{1}{N};$$

In all cases:

$$\sum_i A_i = 1.$$

It will be clearly understood that whilst in this case the activity weighting is based on frame statistics, it could similarly be generated based on group of pictures (GOP) level second order statistics including motion vector and texture variance.

Having generated channel capacity 52, quality weighting 58 and activity weighting 60 for each encoder-client pair, the rate adaptation mechanism 50 then generates 62 the target bit rate for each encoder client pair as follows:

$$\sum_i \frac{A_i Q_i R}{C_1} = 1$$

where $$R = \frac{1}{\sum_j \frac{A_j Q_j}{C_j}}$$

It will be understood that in some cases, in order to provide overhead within the calculation of the target bit rate for local bit rate deviations, a summation total which is less than unity is assigned.

The target bit rate for encoder 32b is then given by: $A_b Q_b R$.

This target bit rate is then fed back to encoder 32b and the incoming video stream 31b is encoded at this rate for transmission. In one embodiment the target bit rates can be recalculated at predetermined time intervals. In one embodiment the time intervals may be determined with reference to the video frames or groups of pictures (GOPs) such that, for example, the recalculation could be performed after each video frame or after each group of pictures (GOP) of the compressed video.

Figure 4:
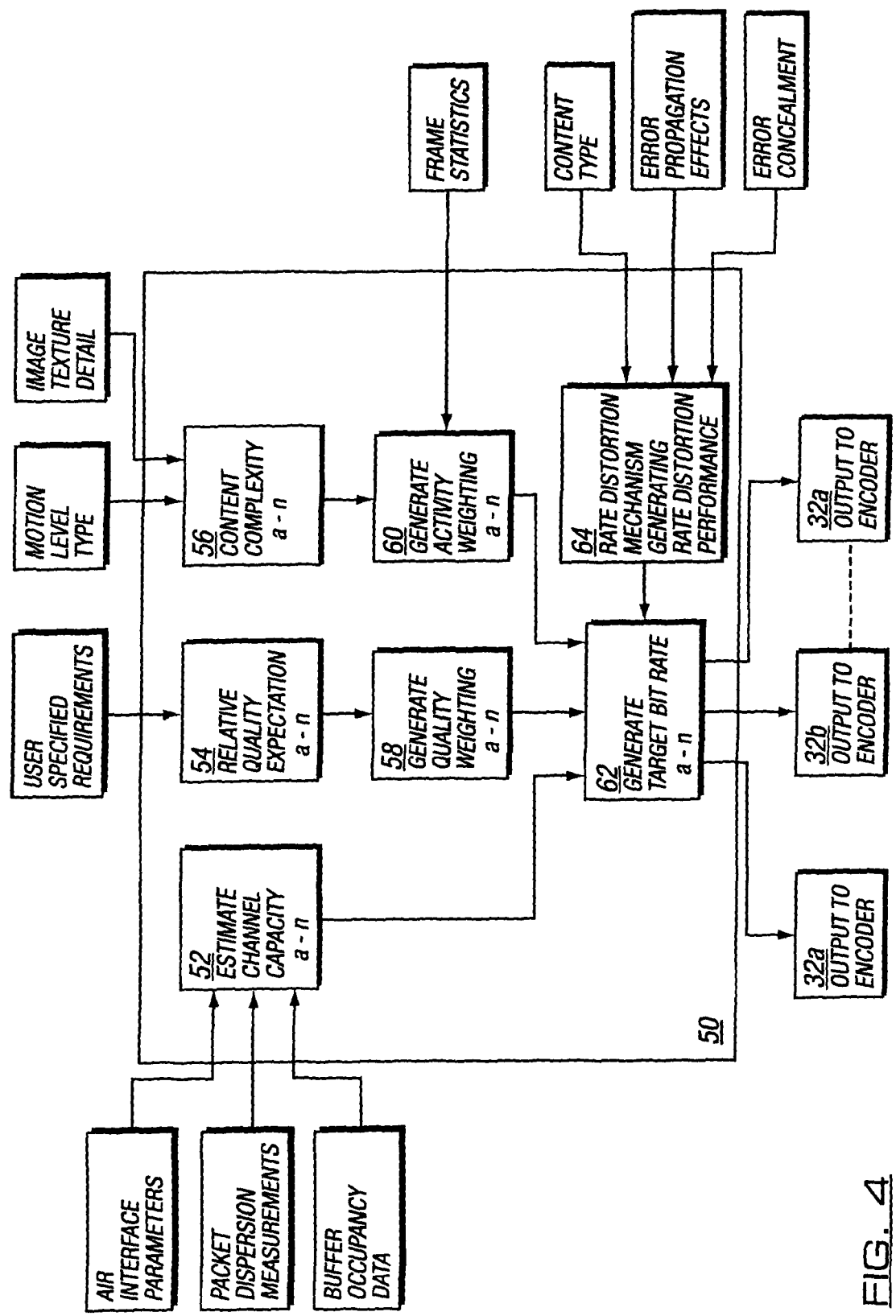
FIG. 4 is a second embodiment of a rate adaptation mechanism for use in the wireless transmission system of FIG. 2.

In a second embodiment of the rate adaptation mechanism 50, shown in FIG. 4, the mechanism 50 is further provided with a rate distortion mechanism 64 for each encoder-client pair. The rate distortion mechanism 64 establishes the rate distortion (RD) performance for each encoder-client pair in the system. The rate distortion mechanism 64 uses data including content type, transmission channel conditions, and the effects of error propagation and concealment at each decoder 38a-38n. The rate adaptation mechanism 50 then generates 62 the target bit rate for each encoder client pair using the generated channel capacity 52, quality weighting 58 and activity weighting 60 along with the RD performance established by the rate distortion mechanism 64 as follows:

$$\sum_i RD_i\left(\frac{A_i Q_i R}{C_i}\right) = 1$$

The established RD performance may be further used by the link adapter 35 to facilitate optimum and adaptive selection of parameters within transmitter 34 and encoders 32a-32n, such as MCS mode switching, quantiser selection and the addition of redundancy to ensure optimum end to end performance, based on video quality rather than throughput alone. For example, for each receiver, an RD model is applied and a decision made whether to change MCS at the transmitter 34 to achieve improved video quality.

In use, if there is no difference in content activity in each video stream 31a-31n, and no difference in quality expectations between displays 40a-40n, the target bit rate determined by the link adapter 35 will be identical for each encoder 32a-32n.

However, when displays 40a-40n have different quality requirements and video streams 31a-31n have variations in content type, the rate adaption mechanism will account for these and thus the target bit rates applied to encoders 32a-32n will vary accordingly. In addition, as individual clients experience different channel conditions to one another for example, resulting in different MCS modes, different automatic repeat request (ARQ) rates or different packet error rates (PER), this will be taken into account by the rate adaptation mechanism 50 and affect the bit allocation generated by the link adaptor 35.

It should be appreciated that although the specific embodiment of the invention provided with reference to the drawings illustrates the use of a wireless data transmission system and a wireless transmission channel, the invention may also be utilised with a "wired" transmission system in which the at least one transmission channel is provided in the form of a cable along which the transmitted data passes between the data sources and the receivers and the same principals of optimising the data transmission can be followed to advantage.

While it is envisaged that the invention is of particular use with regard to systems where only one transmission channel is available, the use of the invention is not limited to such systems, so that, for example, when two or more transmission channels (wireless or cable) are available, the transmission channel capacity will be calculated with regard to the plurality of transmission channels and the bitrates calculated accordingly. A first example of this use would be the use of a single transmitter to transit data to a plurality of receivers and a number of the receivers are connected to a transmission channel A and the other receivers are connected to a transmission channel B. In a further example, the transmitter is again sending data to a number of receivers and the receivers are connected to be capable of receiving data from transmission channels A and B and the combined capacity of the transmission channels A and B is calculated and the data allocated accordingly.

There is therefore provided in accordance with the invention a method and apparatus which allows the efficient and effective transfer of multiple streams of video and/or audio data via at least one transmission channel to a plurality of receivers.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A method of controlling data transfer in a single channel or multichannel video system which comprises one or more video data sources, a transmitter transmits video data from the one or more video data sources using at least one transmission channel, a plurality of client receivers receive transmitted video data over said at least one transmission channel, wherein the method includes the steps of:
   estimating available channel capacity for each of the client receivers using parameters relating to the transmission channel concerned, including using information available at least one of the transmitter and receiver, and information relating to a buffer memory occupancy of video data between the video data sources and the transmitter;

determining a target bit transmit rate for each of the client receivers in dependence upon the estimated available channel capacity, a quality parameter, and an activity parameter for the client receiver concerned; and controlling the video data sources and transmitter to transmit the video data over the transmission channel in dependence upon the determined bit transmit rates wherein the quality parameter for a client receiver relates to the required picture quality of a display connected to the client receiver and the target bit transmit rate for each client receiver is determined based on a proportion of the total parameter values for all of the channels; and wherein a quality weighting (Qi) using the quality parameter and an activity weighting (Ai) using the activity parameter are generated for each of the plurality of client receivers and a rate distortion mechanism is used to establish a rate distortion (RD) value for the transmission to each client receiver and, in conjunction with the said channel capacity (Ci) for each receiver, the target bit transmit rate for each client receiver is generated using $$\sum_i RD_i\left(\frac{A_i Q_i R}{C_i}\right) = 1.$$

2. A method according to claim 1 wherein the estimate of the available channel capacity is made using parameters relating to the transmission channel concerned, and information available at the transmitter and receiver, and information relating to queuing of video data between the video data sources and the transmitter.

3. A method according to claim 1 wherein the target bit transmit rate is determined for each of the client receivers in dependence upon the estimated channel capacity, a quality parameter, and an activity parameter for the client receiver concerned.

4. A method according to claim 1 wherein the at least one transmission channel is a wireless communication means or a cable via which the video can be transmitted.

5. A method as claimed in claim 1 wherein a modulation and coding scheme is also used in determining the target bit transmit rate for a client receiver, the modulation and coding scheme being related to the client receiver concerned.

6. A method as claimed in claim 1, wherein a rate-distortion model is used in determining the target bit transmit rates, the channel rate-distortion model relates to all of the client receivers.

7. A method as claimed in claim 1 wherein the transmitter is a radio transmitter and the client receivers include radio receivers.

8. A data transmission system comprising:
  a plurality of video sources output respective video data streams;
  a transmitter receives video data streams from the plurality of video sources, and operable to transmit such video data streams using transmission channels;
  a plurality of client receivers receive video data streams over respective transmission channels from the transmitter;
  a transmit controller estimate available channel capacity for each client receiver, using parameters relating to the transmission channel concerned, and using information relating to a buffer memory occupancy of video data between the video data sources and the transmitter, to determine a target bit transmit rate for each client receiver in dependence upon estimated channel capacity, a quality parameter, and an activity parameter for the client receiver concerned, and to control the video data sources and transmitter in dependence upon determined target bit transmit rates, wherein the quality parameter for a client receiver relates to respective picture quality for each of the video data sources and the target bit transmit rate for each client receiver is determined based on a proportion of the total parameter values for all of the channels; and wherein a quality weighting (Qi) is generated using the quality parameter and an activity weighting Ai is generated using the activity parameter, and a rate distortion mechanism establishes a rate distortion (RD) for each client receiver and, in conjunction with the channel capacity (Ci) for each receiver, the transmit bit rate for each receiver is generated using $$\sum_i RD_i\left(\frac{A_i Q_i R}{C_i}\right) = 1.$$

9. A system claimed in claim 8, wherein the transmit controller is uses a modulation and coding scheme in determining the target bit transmit rate for a client receiver, the modulation and coding scheme being related to the client receiver concerned.

10. A system as claimed in claim 8, wherein the transmit controller is uses a rate-distortion model in determining the target bit transmit rates, the rate-distortion model relates to all of the client receivers.

11. A system as claimed in claim 8, wherein the transmitter is a radio transmitter and the client receivers include radio receivers.

12. A method of controlling data transfer in a data transmission system which comprises a plurality of video audio data sources, a transmitter transmits the said data from the data sources using at least one transmission channel, a plurality of client receivers operable to receive the data transmitted over the at least one transmission channels, the method comprising:
  estimating available channel capacity for each client receiver, using at least one parameter relating to the at least one transmission channel,
  determining a target bit transmit rate for each client receiver in dependence upon at least one of the estimated channel capacity, a quality parameter, and an activity parameter for the client receiver concerned; and
  controlling the video data sources and transmitter in dependence upon the determined target bit transmit rates, wherein the quality parameter for a client receiver relates to respective picture quality for each of the video data sources and the target bit transmit rate for each client receiver is determined based on a proportion of the total parameter values for all of the channels; and wherein a quality weighting (Qi) using the quality parameter, and an activity weighting (Ai) using the activity parameter are generated for each of the receivers and a rate distortion mechanism is provided to establish a rate distortion (RD) value for each client receiver and, in conjunction with the channel capacity (Ci) for each receiver, the transmit bit rate for each receiver is generated using $$\sum_i RD_i\left(\frac{A_i Q_i R}{C_i}\right) = 1.$$

13. A method according to claim 12 wherein the data is transmitted over a single, wireless, transmission channel.

14. A method according to claim 12 wherein the estimate of the available channel capacity is made with reference to parameters of the information obtained from at least one of packet dispersion measurements relating to queuing of video data between the video data sources and the transmitter.

15. Apparatus for providing and controlling data transfer in a system for transmitting data, said apparatus comprising:
a plurality of video data sources, at least one transmitter to transmit video data streams from the video data sources using at least one transmission channel,
a plurality of client receivers to receive transmitted video data over the at least one transmission channel, wherein the apparatus further includes a transmit controller in communication with the video data sources and transmitter and within the transmit controller there is provided a data stream rate adaptation mechanism to allow the determination of the data bit transmit rates and to control the video data sources and transmitter in dependence upon the said determined bit transmit rates, and
a transmit controller determining a target bit transmit rate for each client receiver with reference to the estimated channel capacity, a quality parameter and the determined bit transmit rate for the client receiver concerned, and wherein a quality parameter for a client receiver relates to respective picture quality for each of the video data sources and a target bit transmit rate for each client receiver is determined based on a proportion of total parameter values for all of the channels; and wherein a quality weighting (Qi) is generated using the quality parameter and an activity weighting (Ai) is generated using the activity parameter, and a rate distortion mechanism is provided to establish a rate distortion (RD) value for each client receiver and, in conjunction with the channel capacity (Ci) for each receiver, the transmit bit rate for each receiver is generated using $$\sum_i RD_i\left(\frac{A_i Q_i R}{C_i}\right) = 1.$$

16. Apparatus according to claim 15 wherein the transmit controller is also in communication with the receivers.

* * * * *